US011250598B2

(12) United States Patent
Shiga

(10) Patent No.: US 11,250,598 B2
(45) Date of Patent: Feb. 15, 2022

(54) IMAGE GENERATION APPARATUS, IMAGE GENERATION METHOD, AND NON-TRANSITORY RECORDING MEDIUM RECORDING PROGRAM

(71) Applicant: TOYOTA JIDOSHA KABUSHIKI KAISHA, Toyota (JP)

(72) Inventor: Takahiro Shiga, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/558,693

(22) Filed: Sep. 3, 2019

(65) Prior Publication Data

US 2020/0111239 A1 Apr. 9, 2020

(30) Foreign Application Priority Data

Oct. 4, 2018 (JP) .............................. JP2018-189503

(51) Int. Cl.
*G06T 11/00* (2006.01)
*G06F 3/147* (2006.01)
(Continued)

(52) U.S. Cl.
CPC .............. *G06T 11/00* (2013.01); *G06F 3/147* (2013.01); *G06K 7/10722* (2013.01);
(Continued)

(58) Field of Classification Search
CPC ......... G06T 7/00; G06T 11/00; G06T 19/006; G06F 3/147; G06F 3/14; G06K 7/10722;
(Continued)

(56) References Cited

U.S. PATENT DOCUMENTS

| 2005/0206654 | A1* | 9/2005 | Vaha-Sipila | G01C 21/20 345/632 |
| 2009/0081959 | A1* | 3/2009 | Gyorfi | H04L 67/18 455/70 |
| 2011/0187743 | A1* | 8/2011 | Hwang | G06K 9/00671 345/633 |
| 2012/0242842 | A1* | 9/2012 | Yoshigahara | G06K 9/22 348/207.1 |

(Continued)

FOREIGN PATENT DOCUMENTS

| JP | 2009-176261 A | 8/2009 |
| JP | 2017-181842 A | 10/2017 |

*Primary Examiner* — Matthew Salvucci
(74) *Attorney, Agent, or Firm* — Oliff PLC

(57) ABSTRACT

An image generation apparatus includes: a memory; and one or more processors configured to receive moving object-related information regarding a moving object from the moving object having identification information that is recognizable from the outside of the moving object, receive, from the usage terminal, usage terminal information regarding a usage terminal and imaging data including an image of the moving object captured by the usage terminal configured to image the moving object, specify the moving object based on the identification information included in the imaging data, generate superimposition image data based on the moving object-related information of the specified moving object and the usage terminal information of the usage terminal having output the imaging data including the image of the moving object, the superimposition image data being an image data to be displayed on a display unit of the usage terminal while being superimposed on the imaging data.

10 Claims, 9 Drawing Sheets

(51) Int. Cl.
*G06K 7/10* (2006.01)
*G06K 7/14* (2006.01)
*G06K 19/06* (2006.01)
*G06T 19/00* (2011.01)
*G06K 9/00* (2006.01)
*G06T 7/00* (2017.01)

(52) U.S. Cl.
CPC ....... *G06K 7/1417* (2013.01); *G06K 9/00671* (2013.01); *G06K 19/06037* (2013.01); *G06T 7/00* (2013.01); *G06T 19/006* (2013.01); *G05B 2219/32014* (2013.01); *G05B 2219/39449* (2013.01); *H04N 2201/3245* (2013.01)

(58) Field of Classification Search
CPC ............. G06K 7/1417; G06K 9/00671; G06K 19/06037; G05B 2219/32014; G05B 2219/39449; H04N 2201/3245; G07C 5/008; G07C 5/0841; G09G 2340/12
USPC ....................................................... 345/633
See application file for complete search history.

(56) References Cited

U.S. PATENT DOCUMENTS

| | | | |
|---|---|---|---|
| 2014/0098249 A1* | 4/2014 | Park | H04N 1/00251 348/207.2 |
| 2014/0267399 A1* | 9/2014 | Zamer | G06K 9/00671 345/633 |
| 2015/0235423 A1* | 8/2015 | Tobita | G06T 19/006 345/633 |
| 2016/0071319 A1* | 3/2016 | Fallon | G06T 19/006 345/633 |
| 2016/0140868 A1* | 5/2016 | Lovett | G06T 19/006 434/118 |
| 2017/0357397 A1* | 12/2017 | Masumoto | G06T 19/006 |
| 2018/0184038 A1* | 6/2018 | Li | G06F 16/532 |
| 2018/0242920 A1* | 8/2018 | Hresko | G06K 9/00671 |
| 2018/0345082 A1* | 12/2018 | Kimura | A63B 71/0686 |
| 2019/0026930 A1* | 1/2019 | Kritzler | G02B 27/0172 |
| 2019/0272428 A1* | 9/2019 | Li | G06K 9/6215 |
| 2020/0184218 A1* | 6/2020 | Cheng | G02B 27/017 |

* cited by examiner

FIG. 8
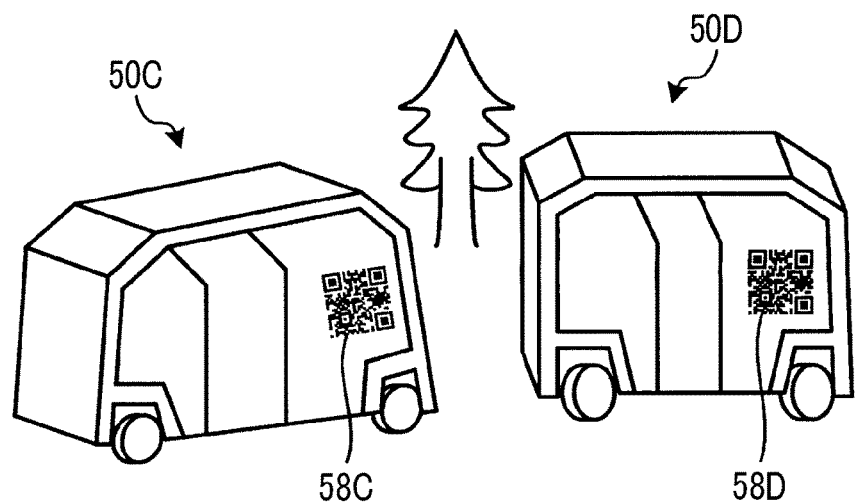
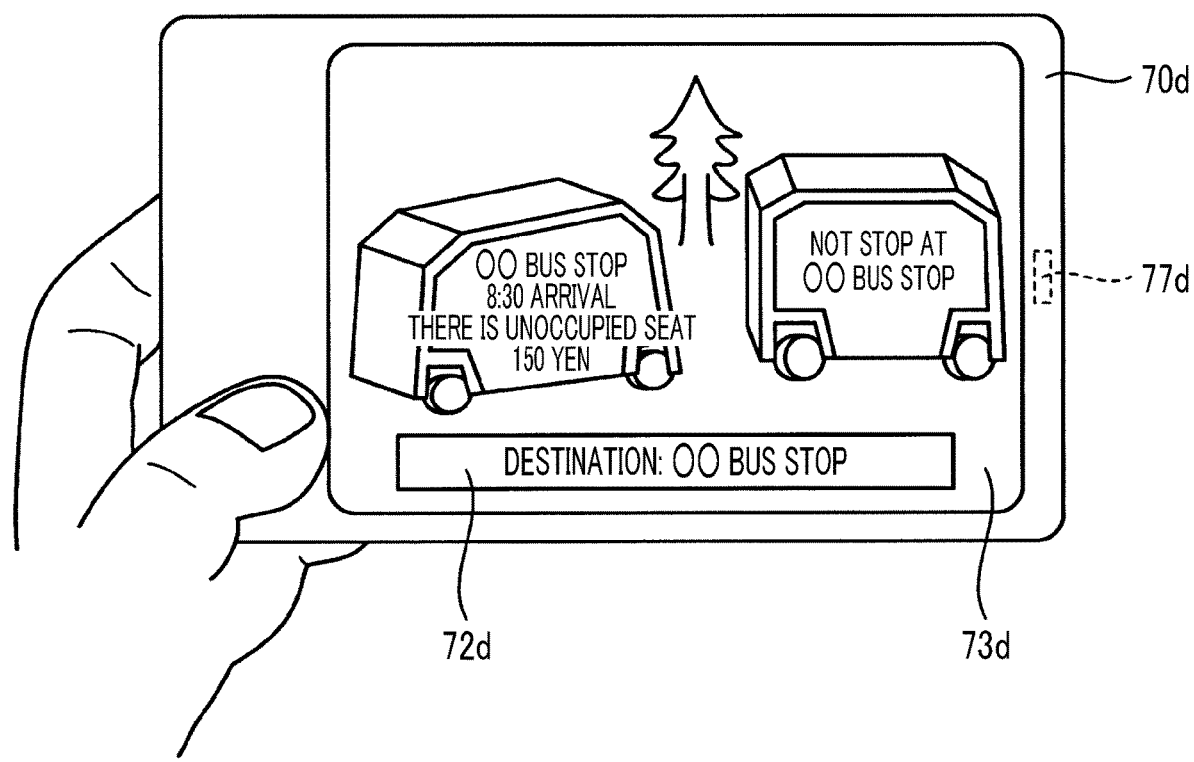

IMAGE GENERATION APPARATUS, IMAGE GENERATION METHOD, AND NON-TRANSITORY RECORDING MEDIUM RECORDING PROGRAM

INCORPORATION BY REFERENCE

The disclosure of Japanese Patent Application No. 2018-189503 filed on Oct. 4, 2018 including the specification, drawings and abstract is incorporated herein by reference in its entirety.

BACKGROUND

1. Technical Field

The disclosure relates to an image generation apparatus, an image generation method, and a non-transitory readable recording medium recording a program.

2. Description of Related Art

In the related art, a vehicle providing a mobility service that can be used for movement, a distribution, and sales of goods has been proposed. In a vehicle providing the mobility service, a digital signage (electronic signboard) has also been proposed which provides information to other vehicles or surrounding people such as pedestrians by displaying the information on an outer surface of the vehicle. As a method of displaying information on an outer surface of a vehicle, for example, Japanese Unexamined Patent Application Publication No. 2009-176261 (JP 2009-176261 A) discloses a technique in which a two-dimensional code seal is stuck to a used vehicle, and thus sales information for the vehicle can be acquired.

SUMMARY

In the related art, a technique in which information provided from a moving object such as a vehicle to the outside is changed as appropriate has been examined. In the technique disclosed in JP 2009-176261 A, neither changing information displayed on an outer surface of a vehicle nor providing information other than sales information related to a moving object by changing information is not examined. Here, a technique may be examined in which a display device displaying information such as a digital signage is provided on an outer surface of a portion that can be recognized from the outside of a moving object, and information displayed on the display device is changed such that information provided to the outside is changed. In a case where the display device is provided on the moving object, and the information provided to the outside is changed, power consumption may increase due to an operation of the display device, or a heating value may increase.

The present disclosure provides a technique of being capable of changing information provided to the outside from a moving object and reducing power consumption and a heating value of the moving object.

A first aspect provides an image generation apparatus including: a memory; and one or more processors each having hardware, the one or more processors being configured to receive moving object-related information regarding a moving object from the moving object having identification information that is recognizable from the outside of the moving object, receive, from a usage terminal, usage terminal information regarding the usage terminal and imaging data including an image of the moving object captured by the usage terminal configured to image the moving object, specify the moving object based on the identification information included in the imaging data, generate superimposition image data based on the moving object-related information of the specified moving object and the usage terminal information of the usage terminal having output the imaging data including the image of the moving object, the superimposition image data being an image data to be displayed on a display unit of the usage terminal while being superimposed on the imaging data, and output the superimposition image data to the memory.

In the image generation apparatus according to the first aspect of the disclosure, the moving object-related information may include service information regarding a service provided by the moving object, and the one or more processors may be configured to select information to be included in the superimposition image data from information included in the service information according to the usage terminal information of the usage terminal.

The image generation apparatus according to the first aspect may further include a transmitter. The one or more processors may be configured to transmit the superimposition image data to the usage terminal via the transmitter.

According to the first aspect, since pieces of information included in superimposition image data can be made different from each other based on service information with respect to usage terminals having different pieces of usage terminal information, pieces of generated superimposition image data can be made different from each other for the respective usage terminals. Consequently, information suitable for each usage terminal can be selected as superimposition image data as appropriate, and can be displayed on a display unit of the usage terminal.

A second aspect provides an image generation method including: receiving moving object-related information regarding a moving object from the moving object having identification information that is recognizable from outside of the moving object; receiving usage terminal information regarding a usage terminal and imaging data including an image of the moving object captured by the usage terminal from the usage terminal configured to image the moving object; specifying the moving object based on the identification information included in the imaging data; and generating superimposition image data based on the moving object-related information of the specified moving object and the usage terminal information of the usage terminal having output the imaging data including the image of the moving object, the superimposition image data being an image date to be displayed on a display unit of the usage terminal while being superimposed on the imaging data; and outputting the superimposition image data to a memory.

A third aspect provides a non-transitory recording medium recording a program. When the program is executed by one or more processors, the program causes the one or more processors to execute: receiving moving object-related information regarding a moving object from the moving object having identification information that is recognizable from an outside of the moving object; receiving usage terminal information regarding a usage terminal and imaging data including an image of the moving object captured by the usage terminal from the usage terminal configured to image the moving object; storing the usage terminal information and the imaging data into a memory; specifying the moving object based on the identification information included in the imaging data; generating superimposition image data based on the moving object-related information of the specified moving object and the usage terminal information of the usage terminal having output the imaging data including the image of the moving object, the superimposition image data being an image data to be displayed on a display unit of the usage terminal while being superimposed on the imaging data; and outputting the superimposition image data to the memory.

In the image generation apparatus, the image generation method, and the non-transitory recording medium recording the program according to the aspects, identification information of a moving object is displayed on a portion that is recognizable from the outside, and the identification information is imaged by a user terminal such that a display content superimposed on an outer portion of the moving object displayed on the user terminal can be changed. Therefore, it is possible to change information provided to the outside from the moving object and to reduce power consumption and a heating value of the moving object.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a diagram for describing Example 3 of the image generation method according to the embodiment of the present disclosure;

DETAILED DESCRIPTION OF EMBODIMENTS

Figure 1:
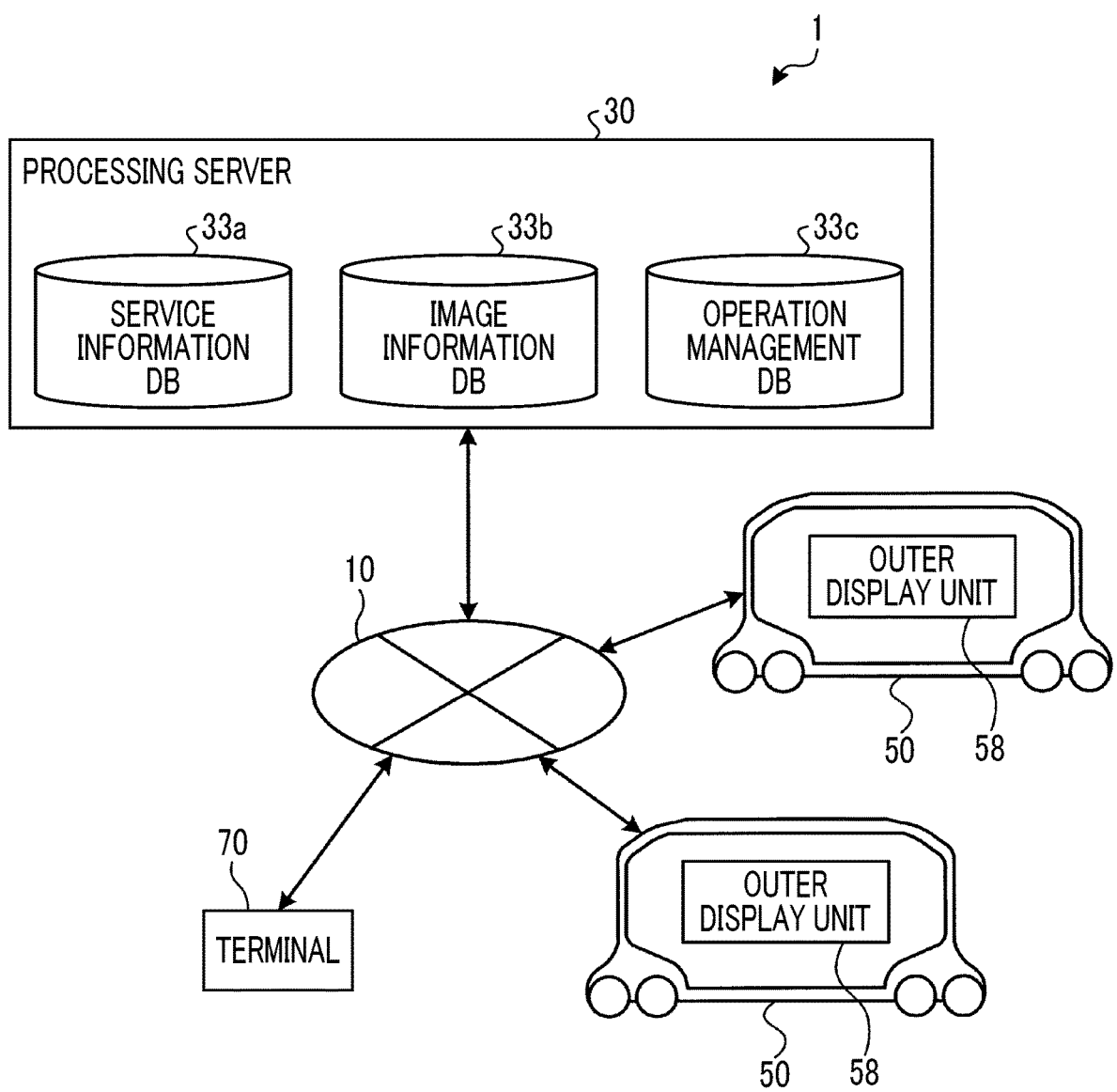
FIG. 1 is a schematic diagram illustrating an image generation system to which an image generation apparatus according to an embodiment of the present disclosure is applicable.

Hereinafter, an embodiment will be described with reference to the drawings. An identical or corresponding portion will be given an identical reference numeral throughout all of the drawings of the embodiment.

Image Generation System

First, a description will be made of an image generation system to which an image generation apparatus according to the embodiment is applied. FIG. 1 is a schematic diagram illustrating an image generation system 1 to which an image generation apparatus according to the present embodiment is applicable. As illustrated in FIG. 1, the image generation system 1 according to the embodiment includes an image generation server 30, at least one vehicle 50 having an outer display unit 58, and a user terminal apparatus 70 which can perform communication with each other via a network 10.

The network 10 may be the Internet or a mobile phone network. The network 10 is, for example, a public communication network such as the Internet, and may include a wide area network (WAN), a telephone communication network for a mobile phone or the like, or other communication networks such as a wireless communication network, for example, Wi-Fi.

Processing Server

The image generation server 30 as an image generation apparatus controls identification information to be displayed on the outer display unit 58 of the vehicle 50, and generates image data to be transmitted to the user terminal apparatus 70. In the present embodiment, various pieces of operation information or vehicle information are supplied from each vehicle 50 to the image generation server 30 at a predetermined timing. The operation information includes information regarding an operation of the vehicle 50, such as position information, speed information, and acceleration information, but is not necessarily limited thereto. The vehicle information includes information regarding situations of the vehicle 50 such as a state of charge (SOC), a residual fuel quantity, and an in-vehicle status, but is not necessarily limited thereto.

Figure 2:
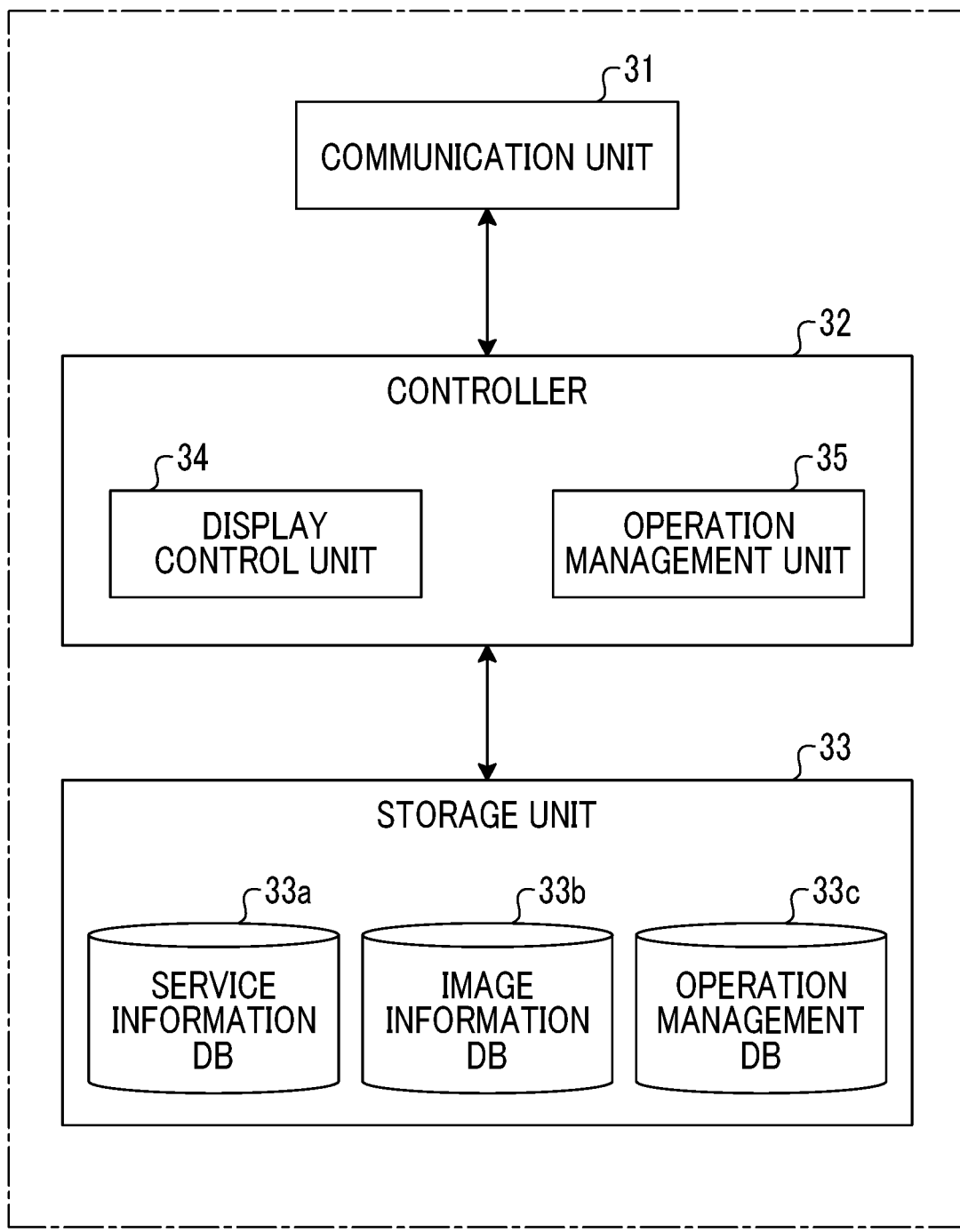
FIG. 2 is a block diagram schematically illustrating a configuration of the image generation apparatus illustrated in FIG. 1.

FIG. 2 is a block diagram schematically illustrating a configuration of the image generation server 30. As illustrated in FIG. 2, the image generation server 30 has a configuration of a general computer which can perform communication via the network 10. The image generation server 30 includes a communication unit 31, a controller 32, and a storage unit 33.

The communication unit 31 is, for example, a local area network (LAN) interface board, or a wireless communication circuit performing wireless communication. The LAN interface board or the wireless communication circuit is connected to the network 10. The communication unit 31 is connected to the network 10, and performs communication with the vehicle 50. The communication unit 31 receives, from each vehicle 50, various pieces of information such as vehicle identification information which is moving object identification information specific to the vehicle 50, operation situation information regarding an operation of the vehicle 50, and service information indicating contents or situations of a service provided by the vehicle 50. The vehicle identification information includes information for enabling each vehicle 50 to be individually identified. The service information includes various pieces of information related to a service provided by the vehicle 50, such as schedule information, for example, a service plan related to the vehicle 50, luggage information regarding mounted luggage, and stock information regarding mounted products. The communication unit 31 transmits, to the vehicle 50, various pieces of information such as a request signal for making a request for transmission of information, and instruction information for controlling the vehicle 50. Moving object-related information includes the vehicle identification information and the service information, but may include the vehicle information or the operation situation information. The moving object-related information is not necessarily limited to such information.

Figure 10:
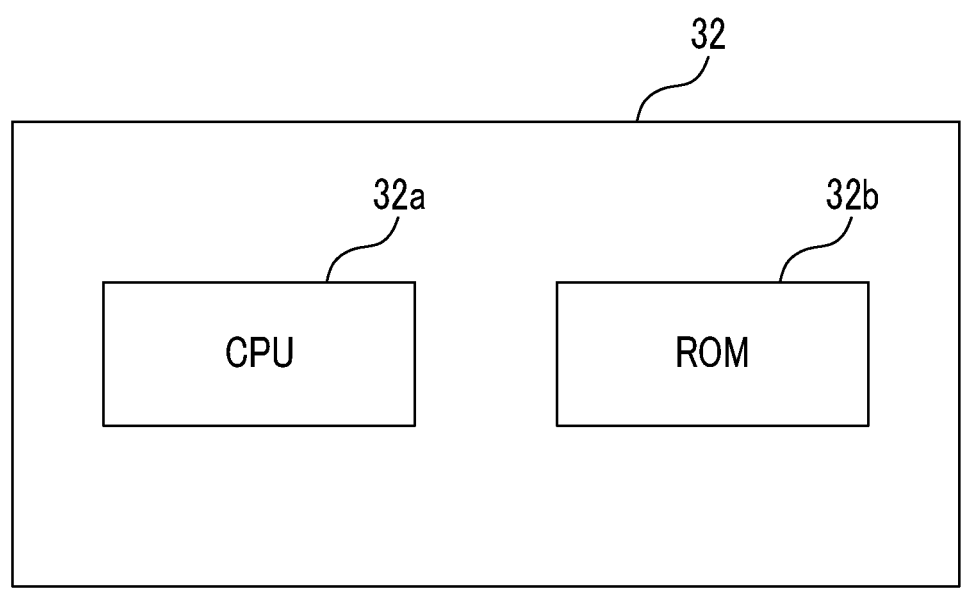
FIG. 10 is a diagram illustrating a configuration of a control unit illustrated in FIG. 2.

The controller 32 includes, for example, a processor such as a central processing unit (CPU), a digital signal processor (DSP), or a field programmable gate array (FPGA), and a main storage unit such as a random access memory (RAM) or a read only memory (ROM). As an example, as illustrated in FIG. 10, in the present embodiment, the controller 32 includes a CPU 32a and a ROM 32b. The storage unit 33 is configured with a storage medium selected from among an erasable programmable ROM (EPROM), a hard disk drive (HDD), and a remote medium. The remote medium is, for example, a Universal Serial Bus (USB) memory or a memory card, or a disc recording medium such as a compact disc (CD), a digital versatile disc (DVD), or a Blu-ray (registered trademark) disc (BD). The storage unit 33 stores an operating system (OS), various programs, various tables, various databases, and the like. The controller 32 loads a program stored in the storage unit 33 to a work region of the main storage unit, executes the program, controls each constituent element through execution of the program, and can thus realize a function matching a predetermined purpose. In the present embodiment, the controller 32 may realize functions of a display control unit 34 and an operation management unit 35 through execution of the program.

The storage unit 33 includes a service information database 33a, an image information database 33b, and an operation management database 33c in which a plurality of pieces of data is stored to be retrievable. Each of image information database 33b, the service information database 33a, and the operation management database 33c is, for example, a relational database (RDB). A database (DB) described below is built by a program of a database management system (DBMS) executed by the processor managing data stored in the storage unit.

The vehicle identification information and the service information are associated with each other, and are stored to be retrievable in the service information database 33a. The service information includes various pieces of information related to a service which can be provided according to an application of the vehicle 50, and includes various pieces of information based on usage situations of the vehicle 50. The service information is information regarding operation time in a case where the vehicle 50 is a bus or a vehicle for ride share, and is information regarding the type of mounted product or a stock quantity in a case where the vehicle 50 is a mobile sales service vehicle. A more specific example of the service information will be described later. Various pieces of image data that are selectable based on the service information by the display control unit 34 are stored in the image information database 33b. The image data may be still image data and may be moving image data. The vehicle identification information and the operation information are associated with each other, and are stored to be retrievable in the operation management database 33c.

When the vehicle identification information is allocated to the vehicle 50, the vehicle identification information is stored to be retrievable in the service information database 33a and the operation management database 33c. The vehicle identification information includes various pieces of information for identifying the respective vehicles 50 from each other. In a case where the vehicle 50 transmits the service information to the image generation server 30 along with the vehicle identification information, the image generation server 30 stores the received service information to be associated with the vehicle identification information and to be retrievable in the service information database 33a. Similarly, in a case where the vehicle 50 transmits information such as the position information or the vehicle information to the image generation server 30 along with the vehicle identification information, the image generation server 30 stores the received information to be associated with the vehicle identification information and to be retrievable in the operation management database 33c.

In the present embodiment, the controller 32 may realize the functions of the display control unit 34 and the operation management unit 35 through execution of the program. The display control unit 34 collects pieces of information such as the service information received from the respective vehicles 50, and the stores the information in the service information database 33a. The display control unit 34 analyzes the service information received from a predetermined vehicle 50 and imaging data received from the user terminal apparatus 70. The display control unit 34 retrieves pieces of image data from the image information database 33b or combines the pieces of retrieved image data with each other, so as to generate superimposition image data to be superimposed on the imaging data. The superimposition image data is transmitted to the user terminal apparatus 70 via the communication unit 31 and the network 10. The operation management unit 35 collects the pieces of vehicle information and operation information from the respective vehicles 50, and stores the information in the operation management database 33c.

Vehicle

Figure 3:
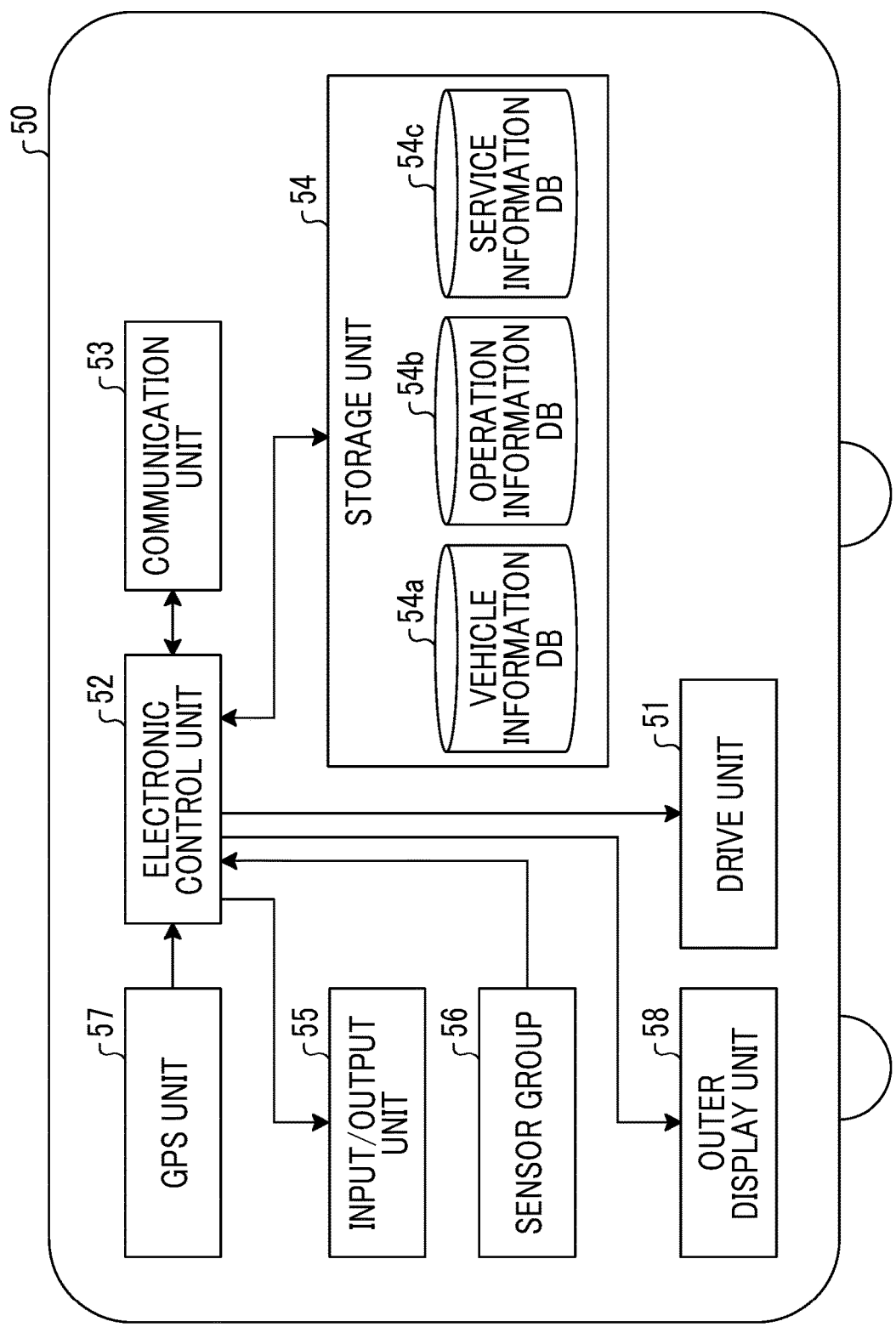
FIG. 3 is a block diagram schematically illustrating a configuration of an on-vehicle apparatus mounted on a vehicle illustrated in FIG. 1.

The vehicle 50 as a moving object is a vehicle which travels due to driver's driving or an autonomous traveling vehicle which can autonomously travel according to a given operation command. FIG. 3 is a block diagram schematically illustrating a configuration of the vehicle 50. As illustrated in FIG. 3, the vehicle 50 includes a drive unit 51, an electronic control unit 52, a communication unit 53, a storage unit 54, an input/output unit 55, a sensor group 56, a GPS unit 57, and the outer display unit 58.

The drive unit 51 is a well-known drive unit of the related art used to cause the vehicle 50 to travel. Specifically, the vehicle 50 is provided with an engine as a drive source, and the engine is configured to be able to generate electric power by using an electric motor or the like through drive caused by combustion of a fuel. The generated electric power charges a chargeable battery. The vehicle 50 includes a drive transmission mechanism transmitting drive force of the engine, drive wheels used for the vehicle to travel, and the like.

The electronic control unit 52 and the storage unit 54 are respectively physically the same as the controller 32 and the storage unit 33. The electronic control unit 52 collectively controls operations of various constituent elements mounted on the vehicle 50. The communication unit 53 is, for example, a data communication module (DCM) which performs communication with at least the image generation server 30 through wireless communication using the network 10. The storage unit 54 includes a vehicle information database 54a, an operation information database 54b, and a service information database 54c. Various pieces of information including a state of charge, a residual fuel quantity, and a current position are stored to be updatable in the vehicle information database 54a. Various pieces of data including the operation information provided from the image generation server 30 are stored to be updatable in the operation information database 54b. Various pieces of information regarding a service provided by the vehicle 50, such as contents or situations of the service corresponding to the type of service provided by the vehicle 50 are stored to be updatable in the service information database 54c.

The input/output unit 55 is configured with a touch panel display, a speaker microphone, and the like. The input/output unit 55 as output means is configured to be able to notify the outside of predetermined information by displaying text, graphics, or the like on a screen of the touch panel display under the control of the electronic control unit 52 or outputting sounds from the speaker microphone. The input/output unit 55 as input means is configured to input predetermined information to the electronic control unit 52 by a user operating the touch panel display or generating a voice toward the speaker microphone.

The sensor group 56 includes sensors regarding traveling of the vehicle 50, such as a vehicle speed sensor and an acceleration sensor, for example, vehicle cabin sensors which can sense various situations of a vehicle cabin, and an imaging device such as an imaging camera. The GPS unit 57 receives a radio wave from a global positioning system (GPS) satellite (not illustrated), and detects a position of the vehicle 50. The detected position is stored to be retrievable in the vehicle information database 54a as position information in the vehicle information. As a method of detecting a position of the vehicle 50, a method in which Light Detection and Ranging or Laser Imaging Detection and Ranging (LiDAR) may be combined with a digital map may be employed.

Figure 4:
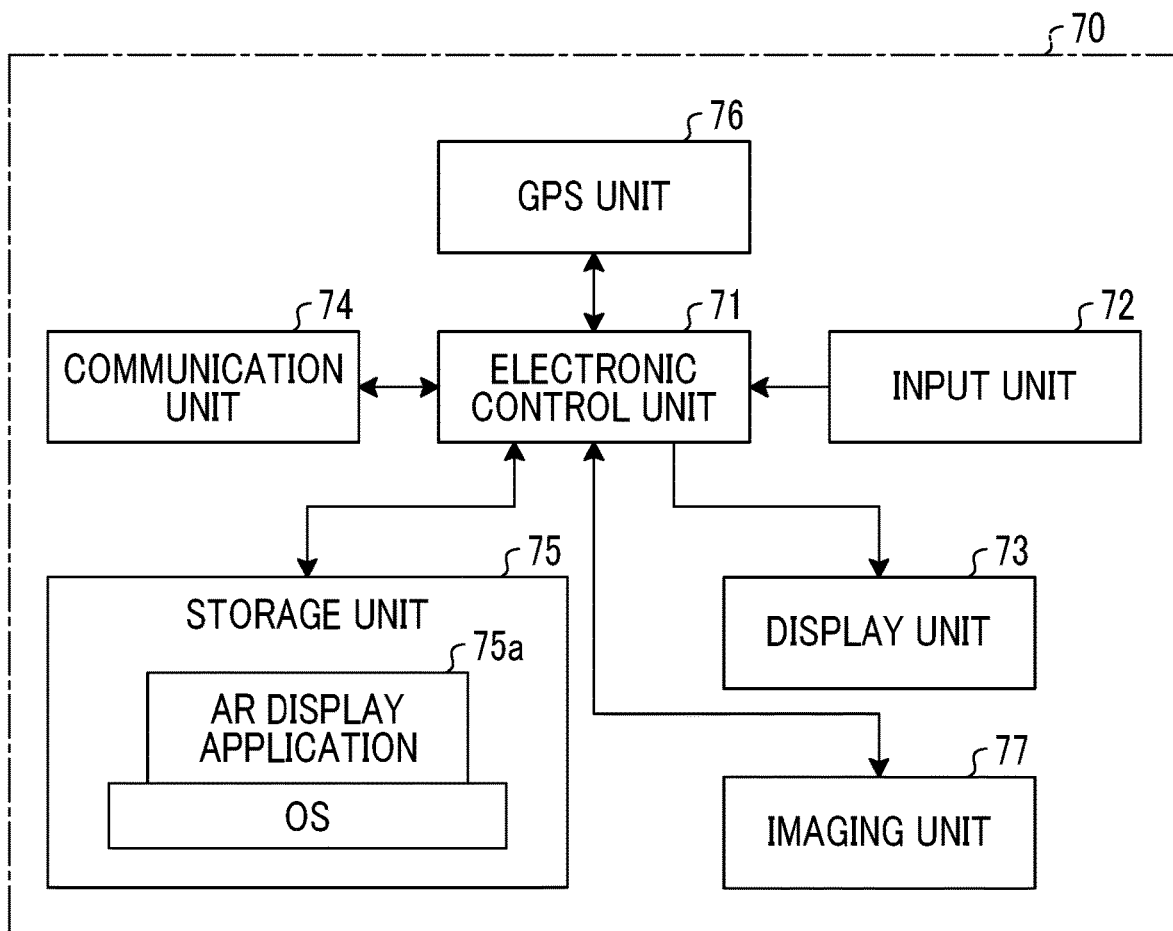
FIG. 4 is a block diagram schematically illustrating a configuration of a user terminal apparatus illustrated in FIG. 1.

The outer display unit 58 is configured with, for example, an organic EL panel or a liquid crystal display panel, and displays text or graphics so as to inform the outside of information. In the present embodiment, the outer display unit 58 displays, identification information, for example, a two-dimensional code such as QR code (registered trademark), a barcode, a character string, a symbol, an icon, or a number string, as at least some information of the vehicle identification information for identifying each vehicle 50. Various pieces of information such as identification information or an image displayed on the outer display unit 58 may be changed by the electronic control unit 52 inputting various pieces of information stored in the storage unit 54 to the outer display unit 58, User Terminal Apparatus The user terminal apparatus 70 is operated by a user. The user terminal apparatus 70 transmits various pieces of information such as imaging data, user information including user identification information and user selection information, and current position information, to the image generation server 30 through, for example, communication of various pieces of data using a communication application. The user information is usage terminal information for identifying the user terminal apparatus 70. The user terminal apparatus 70 is configured to be able to receive various pieces of information such as the superimposition image data from the image generation server 30. FIG. 4 is a block diagram schematically illustrating a configuration of the user terminal apparatus 70 illustrated in FIG. 1.

As illustrated in FIG. 4, the user terminal apparatus 70 includes an electronic control unit 71, an input unit 72, a display unit 73, a communication unit 74, a storage unit 75, a GPS unit 76, and an imaging unit 77 that are communicably connected to each other. The electronic control unit 71, the communication unit 74, the storage unit 75, and the GPS unit 76 are respectively physically the same as the controller 32, the communication units 31, 53, the storage units 33, 54, and the GPS unit 57.

The electronic control unit 71 loads an OS or an AR display application 75a stored in the storage unit 75 to a work region of a main storage unit and executes the OS or the AR display application 75a, and thus collectively controls operations of the input unit 72, the display unit 73, the communication unit 74, the storage unit 75, the GPS unit 76, and the imaging unit 77. In the present embodiment, the AR display application 75a is a program which displays augmented reality (AR) on the display unit 73 under the control of the electronic control unit 71.

The input unit 72 is configured with, for example, a touch panel type keyboard that is incorporated into a keyboard or the display unit 73 and detects a touch operation on a touch panel, or a voice input device which enables calling with the outside. Here, the calling with the outside includes not only calling with another user terminal apparatus 70 but also calling with, for example, an operator or an artificial intelligence system residing in the image generation server 30. The display unit 73 is configured with, for example, an organic EL panel or a liquid crystal display panel, and displays image data stored in the storage unit 75, superimposition image data that is received via the communication unit 74, or imaging data that is obtained through imaging in the imaging unit 77, on a screen thereof. Consequently, a user can recognize the imaging data, image data, and the superimposition image data. The input unit 72 and the display unit 73 may be configured in the same manner as the input/output unit 55.

The communication unit 74 transmits and receives various pieces of information such as user identification information, user selection information, imaging data, and voice data to and from an external server such as the image generation server 30 via the network 10. The storage unit 75 is configured to be able to store user information including the user identification information and the user selection information. The user identification information is information for identifying the user terminal apparatus 70. The user identification information selectively includes various pieces of information such as information regarding an ID specific to the user terminal apparatus 70, the name, the sex, or an address of a user carrying the user terminal apparatus 70, or position information such as longitude and latitude indicating a position or the like of the user. The user selection information selectively includes various pieces of information needed for a user to use the vehicle 50 or various pieces of information such as information that is input from the input unit 72 of the user terminal apparatus 70. The imaging unit 77 is an imaging device such as a camera, and is configured to be able to image a target object. Imaging data obtained through imaging by a user using the imaging unit 77 of the user terminal apparatus 70 is stored in the storage unit 75 by the electronic control unit 71. Imaging data obtained through imaging by the AR display application 75a using the imaging unit 77 is transmitted to the image generation server 30 via the communication unit 74 and the network 10 by the electronic control unit 71. The user terminal apparatus 70 may employ, specifically, a mobile phone such as a smart phone, a tablet type information terminal, or a personal computer.

Image Generation Method

Figure 5:
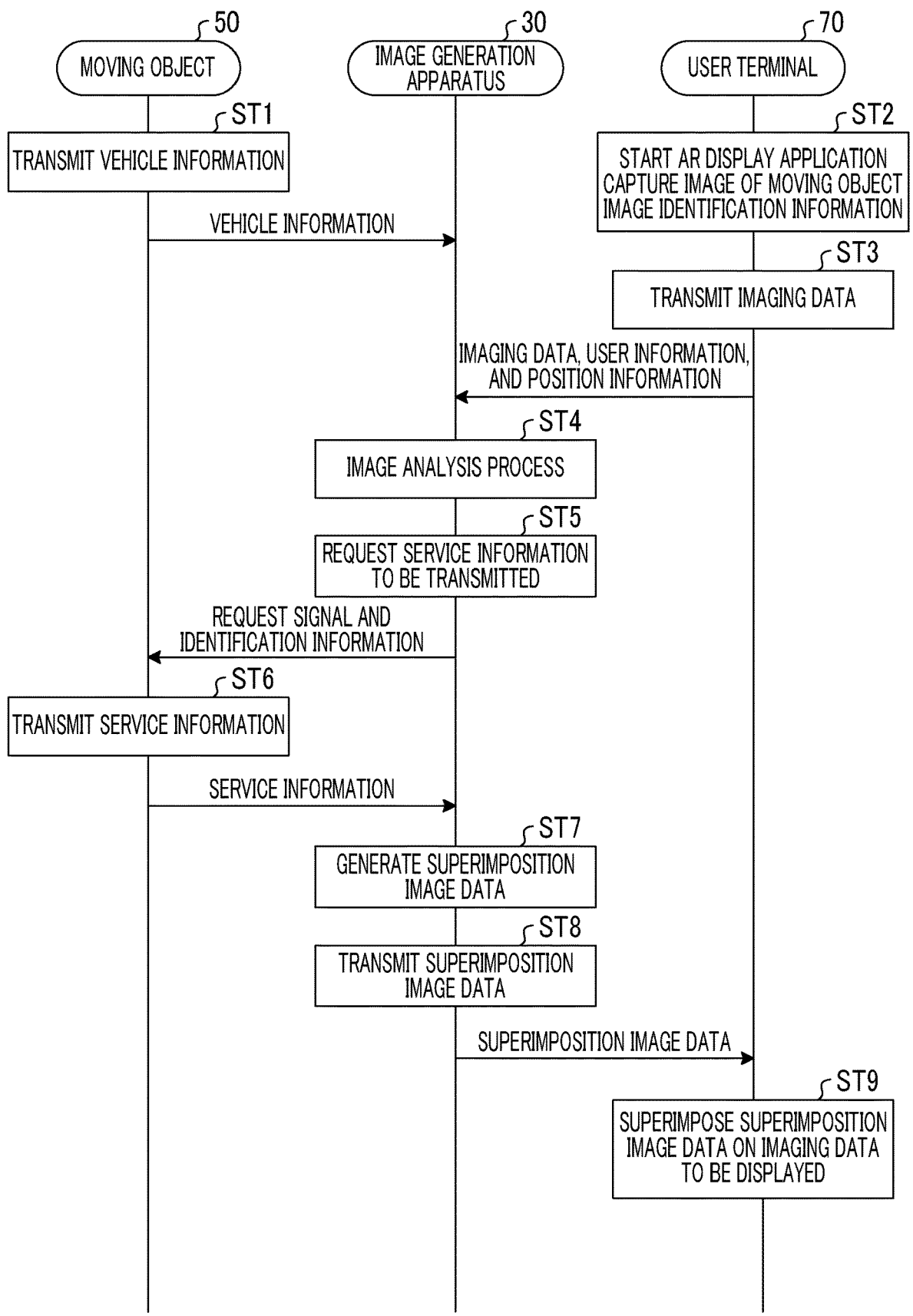
FIG. 5 is a flowchart illustrating a flow of a process of an image generation method according to the embodiment of the present disclosure.

Next, a description will be made of an image generation method executed in the image generation system 1 configured in the above-described way. In the following description, transmission and reception of information are performed via the network 10, but descriptions thereof will be omitted. FIG. 5 is a flowchart for describing an image generation method according to a first embodiment.

In other words, as shown in step ST1 in FIG. 5, the vehicle 50 that is a moving object periodically transmits vehicle information from the communication unit 53 to the image generation server 30 at a predetermined timing under the control of the electronic control unit 52. Here, the predetermined timing is, for example, a periodic timing at a predetermined time interval such as about one minute, but various timings in the vehicle 50 may be set.

On the other hand, in step ST2, the user starts the AR display application 75a in the user terminal apparatus 70, and images the predetermined vehicle 50 by using the imaging unit 77. The starting of the AR display application 75a may be foreground processing and may be background processing. In this case, the imaging unit 77 also images identification information displayed on the outer display unit 58 of the vehicle 50.

In step ST3, the electronic control unit 71 transmits imaging data obtained through imaging in the imaging unit 77 to the image generation server 30 that is an image generation apparatus via the communication unit 74 according to a program of the AR display application 75a. The electronic control unit 71 transmits user information and position information to the image generation server 30 in association with the imaging data during transmission of the imaging data.

Thereafter, in step ST4, the display control unit 34 of the image generation server 30 performs an image analysis process of analyzing the received imaging data. In a case where the display control unit 34 analyzes the identification information included in the imaging data, and outputs the identification information to the operation management unit 35, the operation management unit 35 specifies the vehicle 50 imaged in the imaging data. Similarly, the display control unit 34 specifies the user terminal apparatus 70 which has transmitted the imaging data based on the user identification information included in the user information associated with the imaging data.

In step ST5, the controller 32 transmits a request signal for requesting transmission of service information, to the specified vehicle 50. Thereafter, in step ST6, the vehicle 50 having received the request signal reads service information from the service information database 54c, and transmits the service information to the image generation server 30.

In step ST7, the display control unit 34 of the image generation server 30 generates superimposition image data to be superimposed on the imaging data based on the service information received from the vehicle 50, and the imaging data, the user information, and the position information received from the user terminal apparatus 70. Here, the superimposition image data may be still image data, may be moving image data, and may be text information data. Here, the display control unit 34 may generate the superimposition image data based on the user selection information and the service information. In other words, the display control unit 34 may generate, as the superimposition image data, image data including information corresponding to a service provided by the vehicle 50 imaged by the user and also corresponding to the user selection information by analyzing the service information and the user selection information included in the user information. A specific example of the service information transmitted from the vehicle 50 and a specific example of the user selection information will be described later.

Thereafter, in step ST8, the controller 32 transmits the superimposition image data generated by the display control unit 34, to the user terminal apparatus 70 specified based on the user identification information included in the user information. In step ST9, the electronic control unit 71 of the user terminal apparatus 70 having received the superimposition image data superimposes the superimposition image data on the imaging data, and displays the superimposition result on a screen. Consequently, the user can recognize an image that is displayed in an AR manner on the display unit 73. Consequently, the image generation process according to the present embodiment is finished.

EXAMPLES

Next, a description will be made of specific Examples in which superimposition image data obtained through an image generation process executed as described above is displayed on the display unit 73 of the user terminal apparatus 70 in a superimposition manner.

Example 1

Figure 6:
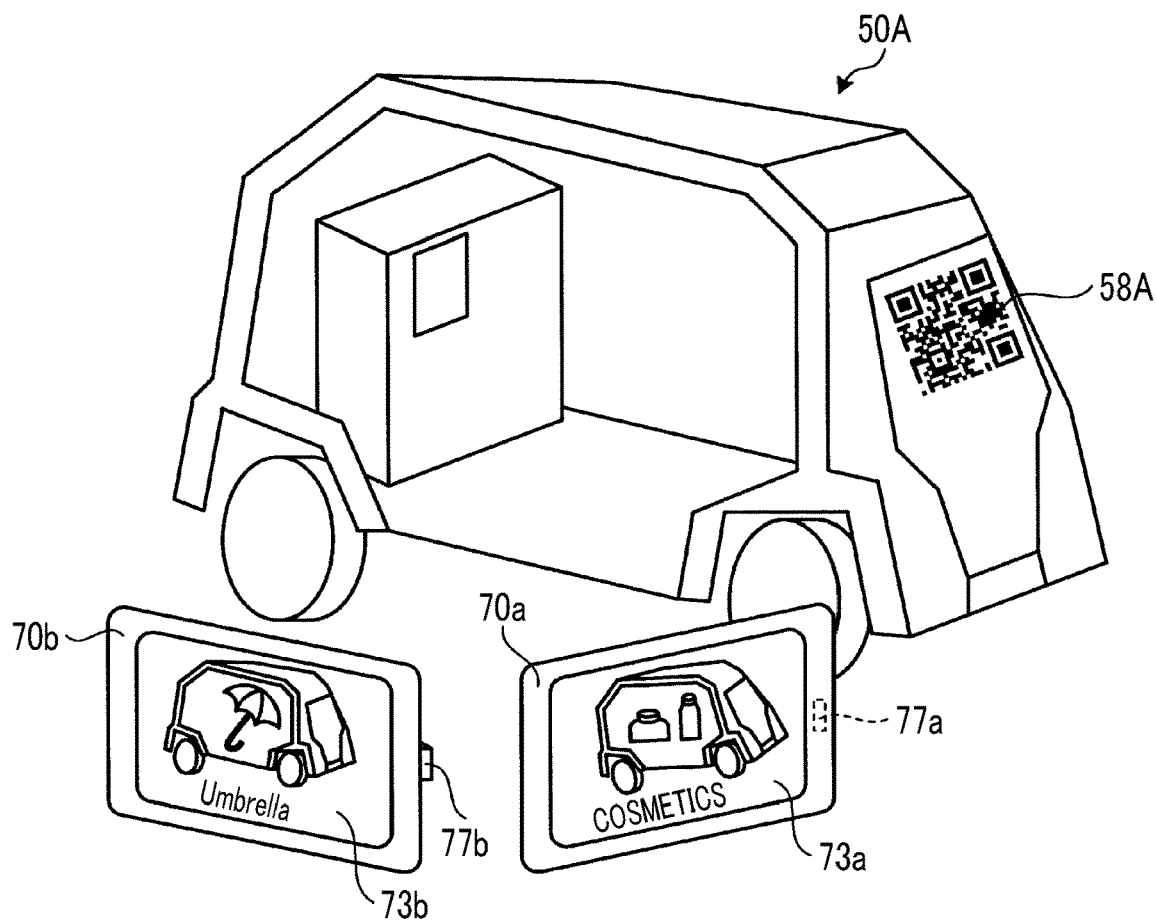
FIG. 6 is a diagram for describing Example 1 of the image generation method according to the embodiment of the present disclosure.

FIG. 6 is a diagram for describing Example 1 of an image generation method according to the embodiment. As illustrated in FIG. 6, each of imaging units 77a, 77b of user terminal apparatuses 70a, 70b images a predetermined vehicle 50A in which identification information is displayed on an outer display unit 58A. In this case, image data in which predetermined superimposition image data is superimposed on an outer surface of the imaged vehicle 50A is displayed on each of display units 73a, 73b based on user identification information or user selection information of user terminal apparatuses 70a, 70b. The example illustrated in FIG. 6 is an example in which the mobile sales vehicle 50A is imaged by the user terminal apparatuses 70a, 70b carried by different users.

As described above, the display control unit 34 of the image generation server 30 generates superimposition image data based on imaging data and user identification information or user selection information received from the user terminal apparatuses 70a, 70b, and service information received from the vehicle 50A, transmits the superimposition image data to the user terminal apparatuses 70a, 70b. Specifically, it is assumed that, in the user identification information received from the user terminal apparatus 70a, the sex, the age, and a language in use of the user are respectively a "female", "20 years old or older", and "Japanese", and, in the service information received from the vehicle 50, for example, information regarding "cosmetics" is included as a category of information provided to females of 20 years old or older. In this case, an image of "cosmetics" and text information indicating "cosmetics" in Japanese are displayed on the display unit 73a of the user terminal apparatus 70a so as to be superimposed on the outer surface of the vehicle 50A. On the other hand, it is assumed that, in the user identification information received from the user terminal apparatus 70b, the sex and a language in use of the user are respectively a "male" and "English", and the user inputs information indicating that the user wants an umbrella as the user selection information by using an input unit (not illustrated) of the user terminal apparatus 70b. It is further assumed that the service information includes information indicating that the vehicle 50A has the "umbrella" in stock. In this case, an image of the "umbrella" and text information indicating "Umbrella" in English are displayed on the display unit 73b of the user terminal apparatus 70b so as to be superimposed on the outer surface of the vehicle 50A.

As mentioned above, changeable identification information is displayed on the outer display unit 58A of the vehicle 50A, a digital signage displaying information directed to walking users and the like around the vehicle 50A is imaged by using the imaging units 77a, 77b of the user terminal apparatuses 70a, 70b such that the vehicle 50A is identified, and superimposition image data is displayed to be superimposed on the vehicle 50A that is displayed on the display units 73a, 73b. Consequently, in a case where the vehicle 50A is viewed by using the respective imaging units 77a, 77b of the user terminal apparatuses 70a, 70b, the image generation server 30 can select information to be provided to the user terminal apparatuses 70a, 70b from the service information, and can generate superimposition image data in which a still image, moving images, or text information is displayed to be superimposed on the entire surface or a partial surface of an outer surface of at least one vehicle 50A. Thus, information appears to be displayed on the vehicle 50A to users using the user terminal apparatuses 70a, 70b, and, even for the same vehicle 50A, different pieces of information can be displayed on the user terminal apparatuses 70a, 70b based on user information. According to Example 1, respective users can recognize pieces of information appropriate for the users using the user terminal apparatuses 70a, 70b. Therefore, the vehicle 50A enables information that can be recognized by a user to be diversified compared with a case where information is merely displayed on the outer display unit 58 of the vehicle 50A, and thus it is possible to improve convenience of providing information to a user.

Example 2

Figure 7:
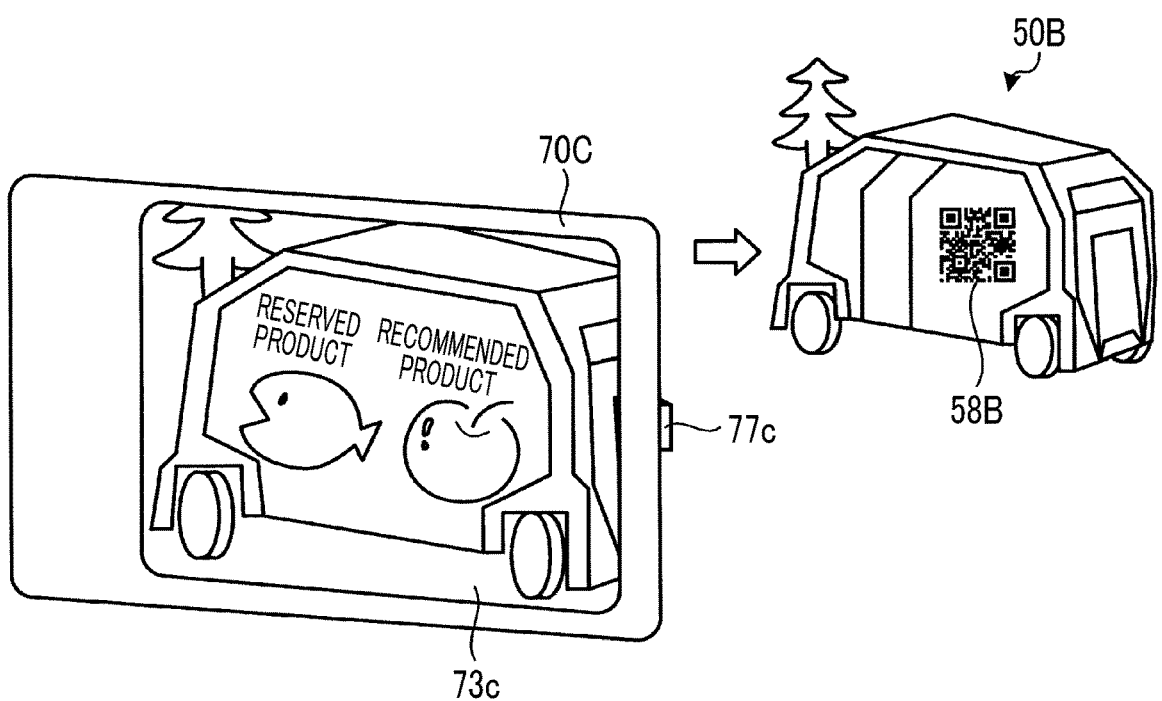
FIG. 7 is a diagram for describing Example 2 of the image generation method according to the embodiment of the present disclosure.

FIG. 7 is a diagram for describing Example 2 of an image generation method according to the embodiment. As illustrated in FIG. 7, in a case where a predetermined vehicle 50B in which identification information is displayed on an outer display unit 58B is imaged by an imaging unit 77c of a user terminal apparatus 70c, image data in which predetermined superimposition image data is superimposed on an outer surface of the imaged vehicle 50B is displayed on a display unit 73c. The example illustrated in FIG. 7 is an example in which the mobile sales vehicle 50B is imaged by the user terminal apparatus 70c carried by a user. In this case, the display control unit 34 of the image generation server 30 generates superimposition image data based on imaging data and user identification information or user selection information received from the user terminal apparatus 70c, and service information received from the vehicle 50B, transmits the superimposition image data to the user terminal apparatus 70c.

Specifically, it is assumed that information regarding a user's preference and information regarding a product of which the user has reserved purchase is included in the user selection information received from the user terminal apparatus 70c, and information regarding products loaded on the vehicle 50B is included in the service information received from the vehicle 50B. In this case, an image of the reserved product, for example, text information indicating "reserved product", an image of a product recommended to the user, and for example, text information indicating "recommended product" are displayed on the display unit 73c of the user terminal apparatus 70c so as to be superimposed on an outer surface of the vehicle 50B. According to Example 2, a user using the user terminal apparatus 70c can visually recognize a needed product or a desired product without checking the inside of the vehicle 50B, and thus it is possible to improve convenience in mobile sales or home delivery using the vehicle 50B.

The vehicle 50B may be not only a mobile sales vehicle but also various moving objects such as a home delivery vehicle which moves with luggage loaded. In other words, in a case where the vehicle 50B carrying luggage or products is loaded with luggage to be received by a user or a product desired to be purchased, such information may be displayed on the display unit 73c of the user terminal apparatus 70c. In the image generation server 30, a product or a service desired to be recommended or a coupon thereof may be displayed on the outer surface of the vehicle 50B by extracting or estimating the age, the sex, preference, or a clothing size of a user based on user identification information transmitted from the user terminal apparatus 70c.

Example 3

FIG. 8 is a diagram for describing Example 3 of an image generation method according to the embodiment. As illustrated in FIG. 8, a predetermined vehicle 50C in which identification information is displayed on an outer display unit 58C and a predetermined vehicle 50D in which identification information is displayed on an outer display unit 58D travel in line. The vehicles 50C, 50D are imaged by an imaging unit 77d of a user terminal apparatus 70d. In this case, image data in which predetermined superimposition image data is superimposed on outer surfaces of the imaged vehicle 50C, 50D is displayed on a display unit 73d, based on user identification information or user selection information of the user terminal apparatus 70d. The example illustrated in FIG. 8 is an example in which the vehicles 50C, 50D such as shared vehicles, for example, buses, are imaged by the user terminal apparatus 70d.

Specifically, a user inputs a destination to an input unit 72d of the user terminal apparatus 70d. The destination is transmitted to the image generation server 30 as user selection information. On the other hand, it is assumed that pieces of information regarding routes of the vehicles 50C, 50D are respectively included in pieces of service information received from the vehicles 50C, 50D. In this case, text information indicating that a bus stop "00 bus stop" at which the vehicle 50C stops, estimated time at which the vehicle arrives at the bus stop "8:30 arrival", and a fare "150 Yen" are displayed on the display unit 73d of the user terminal apparatus 70d so as to be superimposed on the outer surface of the vehicle 50C. Text information indicating that the vehicle 50D does not stop at the bus stop "00 bus stop" included in the user selection information is displayed on the display unit 73d of the user terminal apparatus 70d.

In a case where a distance from a current position to a destination, or the current number of occupied or unoccupied seats of the vehicles 50C, 50D is included in the service information, the distance or the number of occupied or unoccupied seats may also be displayed. Of the vehicles 50C, 50D, the vehicles 50C, 50D that are more convenient in riding to a destination desired by the user may be displayed to be emphasized. Even in a case where a plurality of vehicles 50C, 50D travel in line, related information may be displayed by identifying each of the vehicles 50C, 50D. The related information may be generated based on service information transmitted from the vehicles 50C, 50D. According to Example 3, a user using the user terminal apparatus 70d can recognize a route of a shared vehicle such as a bus or a situation of the inside thereof from the outside, and thus it is possible to improve convenience in use of a bus.

In a case where the vehicles 50C, 50D are vehicles that are needed to be hailed by a user as needed, such as taxis, shared vehicles, mobile sales vehicles, mobile service vehicles, or luggage recovery vehicles, the user may tap a vehicle desired to be hailed of the vehicles 50C, 50D displayed on the display unit 73*d*, so as to hail or reserve the vehicle, or to converse with persons in the vehicles 50C, 50D with voices or messages.

Figure 9:
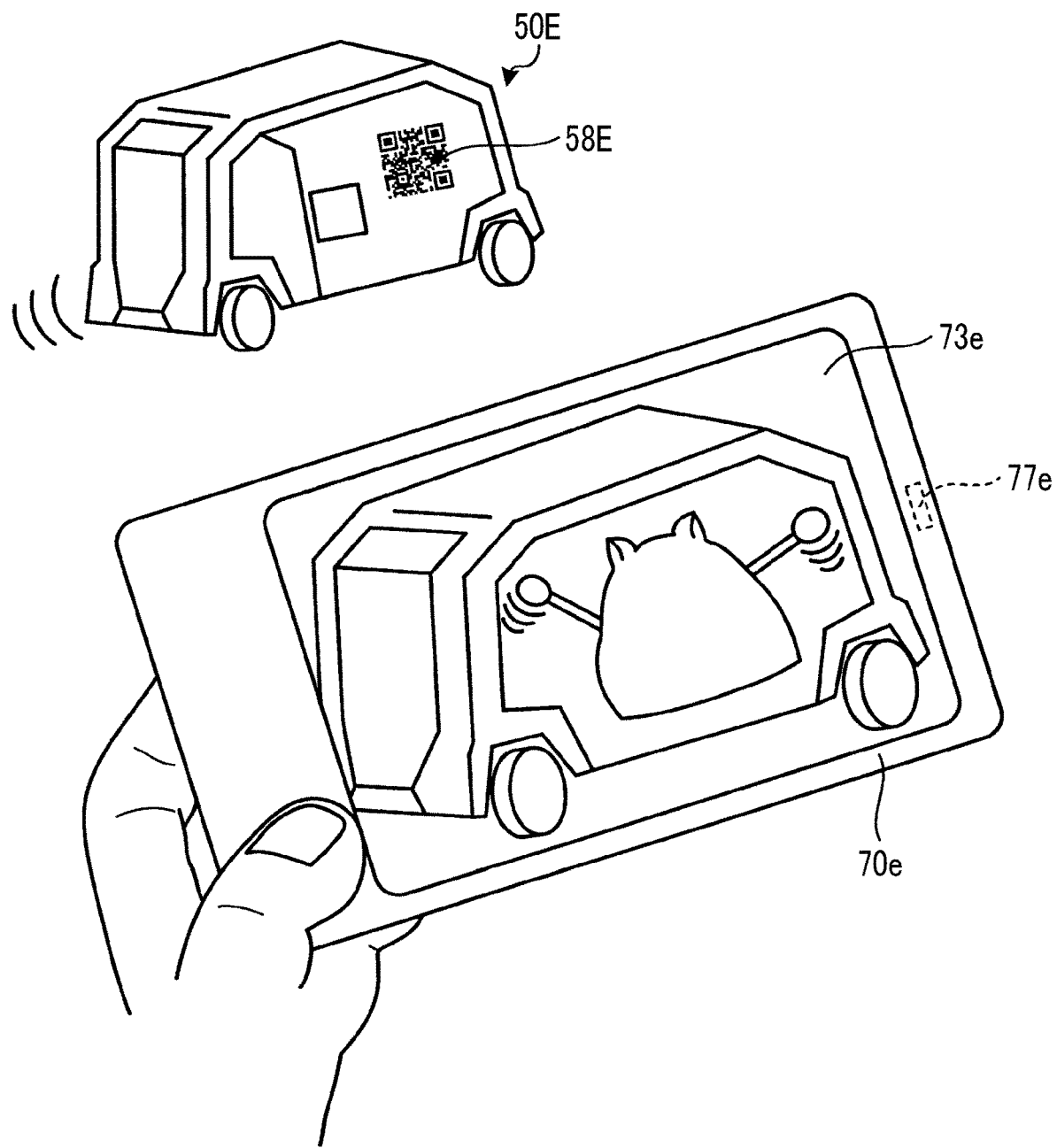
FIG. 9 is a diagram for describing Example 4 of the image generation method according to the embodiment of the present disclosure.

FIG. 9 is a diagram for describing Example 4 of an image generation method according to the embodiment. As illustrated in FIG. 9, in a case where a predetermined vehicle 50E in which identification information is displayed on an outer display unit 58E is imaged by an imaging unit 77*e* of a user terminal apparatus 70*e*, image data in which predetermined superimposition image data is superimposed on an outer surface of the imaged vehicle 50E is displayed on a display unit 73*e* as moving images. The example illustrated in FIG. 9 is an example in which the advertisement vehicle 50E is imaged by the user terminal apparatus 70*e* carried by a user. In this case, the display control unit 34 of the image generation server 30 generates moving image data as superimposition image data based on imaging data and user identification information or user selection information received from the user terminal apparatus 70*e*, and service information received from the vehicle 50E, and transmits the moving image data to the user terminal apparatus 70*e*.

Specifically, it is assumed that information regarding a user's preference or the like is included in the user selection information received from the user terminal apparatus 70*e*, and information regarding a character or the like advertised by the vehicle 50E is included in the service information received from the vehicle 50E. In this case, images of the advertised character are displayed as moving images on the display unit 73*e* of the user terminal apparatus 70*e* so as to be superimposed on an outer surface of the vehicle 50E. In this case, since the identification information is not a moving image, even in a case where variable information using a digital signage is prohibited from being displayed on a traveling vehicle, the user using the user terminal apparatus 70*e* can visually recognize the vehicle 50E of which moving images appear to be reproduced on the outer surface on the display unit 73*e* without displaying moving images on the outer surface of the vehicle 50E. According to Example 4, superimposition image data that is displayed to be superimposed on the outer surface of the vehicle 50E on the display unit 73*e* is moving image information, and thus it is possible to improve convenience of the outer surface of the vehicle 50E as an advertisement medium.

In Examples 1 to 4, it is also possible to provide an interactive operation such as changing of information displayed on the display unit 73*e*, purchase of a product or a service, execution of a game, or acquisition of a point by a user operating a screen of the display unit 73*e* of the user terminal apparatus 70*e* with the finger thereof or the like.

Recording Medium

In the embodiment, a program enabling the image generation method to be executed may be recorded on a recording medium that is readable by a computer or other machines or devices (hereinafter, referred to as a "computer or the like"). The computer or the like reads the program recorded on the recording medium and executes the program, and thus the computer functions as the image generation server 30 of the embodiment. Here, the recording medium that is readable by the computer or the like indicates a non-transitory recording medium in which information such as data or a program is accumulated through electrical, magnetic, optical, mechanical, or chemical action and from which the information can be read by the computer or the like. Among such recording media, examples of a recording medium that is detachable from the computer or the like include a flexible disk, a magneto-optical disc, a CD-ROM, a compact disc-rewritable (CD-R/W), a DVD, a BD, a digital audio tape (DAT), a magnetic tape, and a memory card such as a flash memory. Examples of a recording medium fixed to the computer or the like include a hard disk and a ROM. A solid state drive (SSD) may be used as a recording medium detachable from the computer or the like, and may be used as a recording medium fixed to the computer or the like.

According to the above-described embodiment, identification information of the vehicle 50 can be displayed on the outer display unit 58 that can be recognized from the outside, the vehicle 50 can be identified by the user terminal apparatus 70 identifying the identification information, and a display content superimposed on the outer surface of the vehicle 50 displayed on the display unit 73 can be changed based on user information that is input from the user terminal apparatus 70. Therefore, information provided to the outside from the vehicle 50 can be changed as appropriate, power consumption, a heating value, or a weight of the vehicle 50 can be reduced compared with a case where a digital signage is directly displayed on the vehicle, and thus it is possible to perform customizing of information provided to the outside by using the vehicle 50 with high efficiency.

As mentioned above, the embodiment has been described in detail, but the scope of the present disclosure is not limited to the embodiment, and various modifications based on the technical spirit of the present disclosure may occur. For example, the configurations of the server, the vehicle, and the user terminal apparatus described in the embodiment are merely examples, and configurations of the server, the vehicle, and the user terminal apparatus that are different from those in the embodiment may be used.

For example, the configuration of the server or the type of information described in the embodiment is merely an example, and a configuration of the server or the type of information that is different from that in the above example may be employed as needed.

In the embodiment, the display control unit 34 and the operation management unit 35 corresponding to functions of the controller 32 are configured by the single image generation server 30, but may be configured by a plurality of servers which can perform communication with each other via the network 10. In other words, a display control server including the display control unit 34 and an operation management server including the operation management unit 35 may be configured separately via the network 10.

For example, in the embodiment, any one of the respective functional constituent elements of the image generation server 30 or some processes therein may be executed by another computer connected to the network 10. A series of processes executed by the image generation server 30 may be executed by hardware, and may be executed by software.

For example, in the first embodiment, the image generation server 30 is a single server, but the image generation server 30 may be configured with a plurality of separate servers which can perform communication with each other. Specifically, for example, the storage unit 33 of the image generation server 30 may be provided in another data server which can perform transmission and reception of information via the network 10. The service information database 33*a*, the image information database 33*b*, and the operation management database 33*c* in the storage unit 33 of the image generation server 30 may be respectively stored in different data servers. The image generation server 30 may store various pieces of image data collected in the past via the network 10 as a database including, for example, big data.

In the embodiment, identification information is displayed on the outer display unit 58, but the identification information may be provided to the outside in various methods as long as the vehicle 50 can be identified. For example, the identification information may be a barcode or the like attached to a portion of the vehicle 50 that can be recognized from the outside, and may be a license plate of the vehicle 50.

In the embodiment, the image analysis process of imaging data in step ST4 is executed in the image generation server 30, but the image analysis process may be executed in the user terminal apparatus 70. In this case, result information of the image analysis process may be transmitted to the image generation server 30, and the image generation server 30 may generate superimposition image data based on service information and the result information transmitted from the vehicle 50.

In the embodiment, some or all of the processes in the image generation server 30 may be executed in the vehicle 50. Generation of superimposition image data may be executed in the user terminal apparatus 70. The various processes executed in the image generation server 30 in the embodiment may be distributed to a plurality of servers through transmission and reception of information using the network 10.

In the embodiment, identification information is variable identification information, but various pieces of information may be used as the identification information. Specifically, as the identification information, printed identification information, or a license plate or an exterior feature of the vehicle 50 may be used. The image generation server 30 may integrate specific identification information of the user terminal apparatus 70, pieces of position information of the vehicle 50 and the user terminal apparatus 70, and information indicating a direction in which the imaging unit 77 or the user terminal apparatus 70 or the vehicle 50 is directed, and may identify and specify the vehicle 50. In this case, the image generation server 30 selects information to be displayed on the user terminal apparatus 70 based on identification of the vehicle 50 and user information of the user terminal apparatus 70, and generates superimposition image data in accordance with a shape of the vehicle 50.

What is claimed is:

1. An image generation apparatus comprising:
   a memory; and
   one or more processors each having hardware, the one or more processors being configured to:
   allocate identification information individually identifying a moving object, the identification information being recognizable from outside of the moving object and being changeable by the moving object;
   periodically receive moving object-related information regarding the moving object from the moving object, the moving object-related information including the identification information;
   receive, from a usage terminal configured to image the moving object, usage terminal information regarding the usage terminal and imaging data including an image of the moving object captured by the usage terminal, the usage terminal information including user information associated with a user, the user information indicating at least one of a sex of the user, an age of the user, and a language in use by the user, the usage terminal being disposed remotely from the one or more processors, and the imaging data being received after the identification information has been received from the moving object;
   specify the moving object based on the identification information included in the imaging data;
   transmit a request to the specified moving object in response to specifying the moving object, the request requesting transmission of service information regarding a service provided by the moving object;
   receive service information from the specified moving object after transmitting the request to the moving object;
   select information to be provided to the user based on the service information and at least one of the sex of the user, the age of the user, and the language in use by the user;
   generate superimposition image data based on the selected information to be provided to the user, the superimposition image data being an image data to be displayed on a display unit of the usage terminal while being superimposed on the imaging data; and
   output the superimposition image data to the memory, wherein
   the service provided by the moving object is associated with the user by the user information, and
   the superimposition image data is (i) related to the service provided by the moving object associated with the user and (ii) displayed so as to be superimposed on a surface of the moving object in the image.

2. The image generation apparatus according to claim 1, further comprising a transmitter,
   wherein the one or more processors are configured to transmit the superimposition image data to the usage terminal via the transmitter.

3. The image generation apparatus according to claim 1, wherein the moving object is disposed remotely from the one or more processors.

4. The image generation apparatus according to claim 1, wherein
   the user information indicates the language in use by the user, and
   the superimposition image data includes text information written in the language in use by the user.

5. An image generation method comprising:
   allocating identification information individually identifying a moving object, the identification information being recognizable from outside of the moving object and being changeable by the moving object;
   periodically receiving, by one or more processors, moving object-related information regarding the moving object from the moving object, the moving object-related information including the identification information;
   receiving, by the one or more processors, usage terminal information regarding a usage terminal configured to image the moving object and imaging data including an image of the moving object captured by the usage terminal from the usage terminal, the usage terminal information including user information associated with a user, the user information indicating at least one of a sex of the user, an age of the user, and a language in use by the user, the usage terminal being disposed remotely from the one or more processors, and the imaging data being received after the identification information has been received from the moving object;
   specifying, by the one or more processors, the moving object based on the identification information included in the imaging data;
   transmitting a request to the specified moving object in response to specifying the moving object, the request requesting transmission of service information regarding a service provided by the moving object;

receiving service information from the specified moving object after transmitting the request to the moving object;

selecting information to be provided to the user based on the service information and at least one of the sex of the user, the age of the user, and the language in use by the user;

generating, by the one or more processors, superimposition image data based on the selected information to be provided to the user, the superimposition image data being an image data to be displayed on a display unit of the usage terminal while being superimposed on the imaging data; and outputting, by the one or more processors, the superimposition image data to a memory, wherein the service provided by the moving object is associated with the user by the user information, and the superimposition image data is (i) related to the service provided by the moving object associated with the user and (ii) displayed so as to be superimposed on a surface of the moving object in the image.

6. The method of claim 5, wherein the moving object is disposed remotely from the one or more processors.

7. The method of claim 5, wherein the user information indicates the language in use by the user, and the superimposition image data includes text information written in the language in use by the user.

8. A non-transitory recording medium recording a program, wherein when the program is executed by one or more processors, the program causes the one or more processors to execute steps of:

allocating identification information individually identifying a moving object, the identification information being recognizable from outside of the moving object and being changeable by the moving object;

periodically receiving moving object-related information regarding the moving object from the moving object, the moving object-related information including the identification information;

receiving usage terminal information regarding a usage terminal configured to image the moving object and imaging data including an image of the moving object captured by the usage terminal from the usage terminal, the usage terminal information including user information associated with a user, the user information indicating at least one of a sex of the user, an age of the user, and a language in use by the user, the usage terminal being disposed remotely from the one or more processors, and the imaging data being received after the identification information has been received from the moving object;

storing the usage terminal information and the imaging data into a memory;

specifying the moving object based on the identification information included in the imaging data;

transmitting a request to the specified moving object in response to specifying the moving object, the request requesting transmission of service information regarding a service provided by the moving object;

receiving service information from the specified moving object after transmitting the request to the moving object;

selecting information to be provided to the user based on the service information and at least one of the sex of the user, the age of the user, and the language in use by the user;

generating superimposition image data based on the selected information to be provided to the user, the superimposition image data being an image data to be displayed on a display unit of the usage terminal while being superimposed on the imaging data; and outputting the superimposition image data to the memory, wherein the service provided by the moving object is associated with the user by the user information, and the superimposition image data is (i) related to the service provided by the moving object associated with the user and (ii) displayed so as to be superimposed on a surface of the moving object in the image.

9. The non-transitory recording medium of claim 8, wherein the moving object is disposed remotely from the one or more processors.

10. The non-transitory recording medium of claim 8, wherein the user information indicates the language in use by the user, and the superimposition image data includes text information written in the language in use by the user.

\* \* \* \* \*